US008944399B2

(12) United States Patent
Sutherland et al.

(10) Patent No.: US 8,944,399 B2
(45) Date of Patent: Feb. 3, 2015

(54) UNIVERSAL MOUNTING SYSTEM

(76) Inventors: Scott Sutherland, Hood River, OR (US); Blake Richards, Hood River, OR (US); Dennis Dekruyf, Hood River, OR (US)

(*) Notice: Subject to any disclaimer, the term of this patent is extended or adjusted under 35 U.S.C. 154(b) by 941 days.

(21) Appl. No.: 11/824,992

(22) Filed: Jul. 2, 2007

(65) Prior Publication Data
US 2008/0087211 A1 Apr. 17, 2008

Related U.S. Application Data

(60) Provisional application No. 60/842,794, filed on Sep. 6, 2006.

(51) Int. Cl.
*F16M 13/00* (2006.01)
*B63B 17/00* (2006.01)

(52) U.S. Cl.
CPC ...................................... *B63B 17/00* (2013.01)
USPC ........................ 248/519; 248/523; 248/222.13

(58) Field of Classification Search
USPC ................. 248/511, 519, 523, 524, 535, 539, 248/220.21, 220.22, 222.13, 223.41; 211/197; 52/298, 30, 37, 75; 43/21.2; 206/315.11; 114/343, 364; 403/359.1–359.6; 135/28, 30, 37, 75
See application file for complete search history.

(56) References Cited

U.S. PATENT DOCUMENTS

| | | | | |
|---|---|---|---|---|
| 3,796,502 A * | 3/1974 | Federspiel | | 403/106 |
| 3,831,838 A * | 8/1974 | Kline et al. | | 232/43.2 |
| 4,289,414 A * | 9/1981 | Recker | | 403/12 |
| 4,392,759 A * | 7/1983 | Cook | | 403/11 |
| 4,419,873 A * | 12/1983 | Sopko | | 70/38 A |
| 4,485,579 A * | 12/1984 | Hawie | | 43/21.2 |
| 4,601,502 A * | 7/1986 | Van Dyke | | 292/252 |
| 4,827,654 A * | 5/1989 | Roberts | | 43/21.2 |
| 4,859,110 A * | 8/1989 | Dommel | | 403/325 |
| 5,313,734 A * | 5/1994 | Roberts | | 43/21.2 |
| 5,385,323 A * | 1/1995 | Garelick | | 248/161 |
| 5,632,568 A * | 5/1997 | Fechter | | 403/328 |
| 5,826,850 A * | 10/1998 | Goldsmith | | 248/415 |
| 7,757,424 B2 * | 7/2010 | Follmar | | 43/21.2 |
| 2006/0185404 A1 * | 8/2006 | Hansen | | 70/38 A |

* cited by examiner

*Primary Examiner* — Alfred J Wujciak

(57) ABSTRACT

The invention is a universal mounting system allowing a wide variety of accessories to be used interchangeably among one or more mounts secured to convenient surfaces or structures, such as the gunnel of a boat. The universal mount system includes a mount having barrel configured to receive the insert member of an accessory. A locking mechanism on the mount engages the insert automatically and interlocking splines on the insert member and along the barrel of the mount secure the insert at a desired rotational orientation.

21 Claims, 14 Drawing Sheets

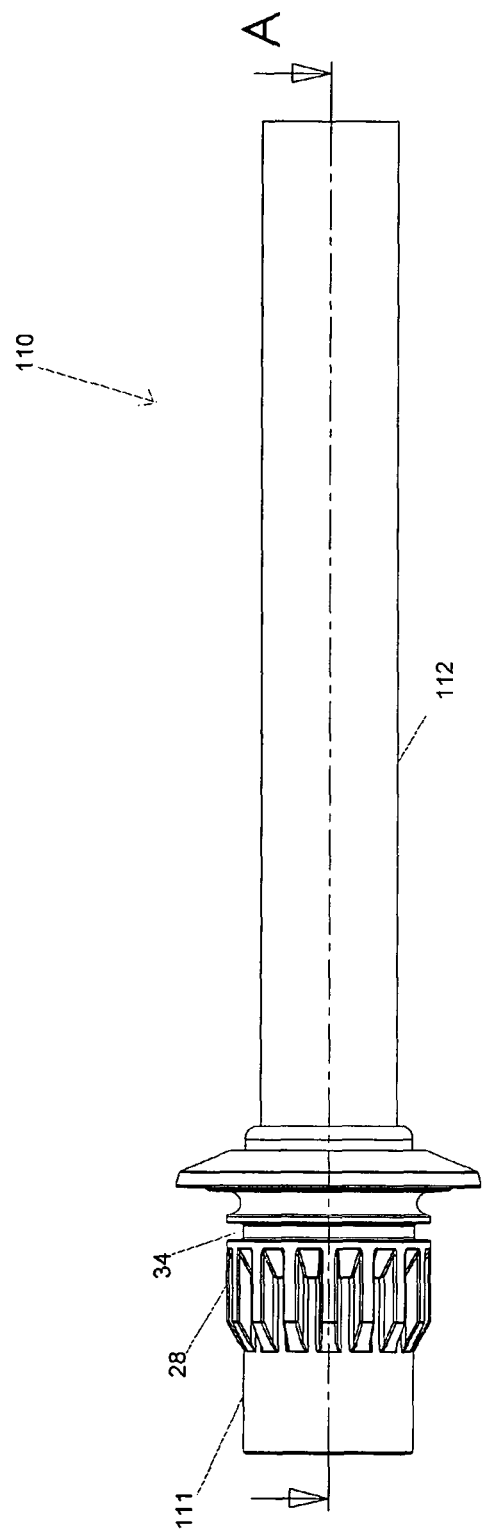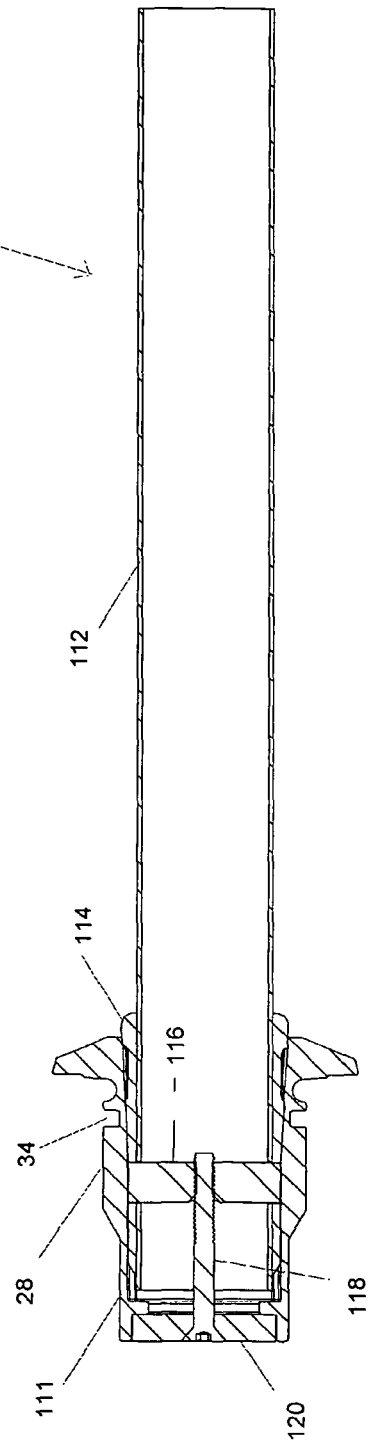

UNIVERSAL MOUNTING SYSTEM

RELATED APPLICATIONS

This application is a continuation-in-part of U.S. Provisional Patent Application Ser. No. 60/842,794, filed Sep. 6, 2006.

FIELD OF THE PRESENT INVENTION

This invention relates generally to accessories and the mounting of accessories to a vehicle, such as a boat, or any fixed object. More particularly, this invention relates to a universal mount designed to accept a wide variety of accessories, which is capable of releasably securing the accessory to a surface and locking the accessory in a rotational orientation as desired.

BACKGROUND OF THE INVENTION

Conventional marine accessories typically need to be attached to a portion of the boat hull, such as the gunnel, or other suitable structure to serve the intended purpose of the accessory. Accordingly, most manufacturers design and supply individual, custom mounts for each product they sell. This requires the boat or vehicle owner to mount individual and varying accessories in multiple locations on the gunnel. The decisions of how to arrange these mounts for convenience and utility are difficult and require custom holes to be drilled into the boat gunnel or hull. When the owner wants to move the accessory or upgrade to a different model or competitive product the entire arrangement is not optimized and the existing screw and mounting holes are often inappropriate for the new accessory and arrangement. As a result, extensive repairs to the gunnels are required or the boat owner must live with a non-optimized configuration.

Similarly, various accessories exist for automotive or military applications that preferably are mounted to a fixed surface of a vehicle or other structure. As with marine accessories, it is desirable for the accessories to be secured to the structure in a releasable manner. It is also often desirable for the accessory to be locked in a specific rotational orientation in order to facilitate use of the accessory. The same drawbacks associated with conventional marine accessories are found in these fields and others where a wide variety of accessories are used.

An example of a prior art mounting system used in marine applications is offered by Scotty (British Columbia, Canada). This company manufacturers rod holders and mountings systems. For example, one product is item #344 "Round Flush Deck Mount," which features a mounting plate designed to accept post mount rod holders that are also available from Scotty. This system employs a relatively small diameter post that uses interlocking splines to lock the post and mount into specific rotational orientations. The system also employs a retention mechanism in which the post features a raised ring at the bottom with a single cutout. A projection at the bottom of the deck mount allows the post to be inserted so that the raised ring can pass beyond the projection only when the post is rotationally oriented so that the projection aligns with the cutout. Once the raised ring is inserted beyond the projection, rotation of the post so that the projection is not aligned with the cutout prevents the post from being completely withdrawn due to the interference between the projection and the raised ring. Nevertheless, in this orientation, axial movement between the post and the mount is possible. Specifically, the post can be withdrawn to the point where the projection hits the raised ring. This pulls the splines out of engagement and allows the post to be rotated within mount.

Although this mount represents an improvement over other mounting accessories, it is limited by a number of drawbacks. For example, the post must be inserted in a specific rotational orientation to allow the projection to pass through the cutout. This may be inconvenient or difficult depending upon the type of accessory being used. Also, it can be frustrating for the user to determine and utilize the exact alignment every time the post is inserted.

Another drawback is that this system is not a secure locking mechanism that prevents axial motion, rather it is simply a failsafe retention system. Even when in the retention positions, the post can still travel up and down within the mount between positions where the splines are engaged or disengaged. Furthermore, the retention system is not engaged if the post happens to be rotationally positioned so that the projection aligns with the cutout.

Accordingly, what has been needed is a universal mounting system that is appropriate for a wide range of accessories. Preferably, the design should robust and simple. Also preferably, the locking mechanism should be operable at any rotational orientation and should substantially prevent any axial movement of the accessory within the mount when engaged.

Similarly, there is a need for a universal mount that is adapted for use in other fields, such as automotive or military, or may be used with any structure, whether mobile or stationary.

SUMMARY OF THE INVENTION

In accordance with the above objects and those that will be mentioned and will become apparent below, the present invention is a universal mounting system for receiving and securing an insert comprising a universal mount with a body including an upper portion, a barrel having a center orifice with an interior diameter, and a locking member that automatically engages the insert when the insert is fully positioned within barrel, regardless of the insert's rotational orientation with respect to the universal mount. Preferably, the interior diameter comprises a plurality of splines aligned with a longitudinal axis of the barrel. In the noted embodiments, the plurality of splines are evenly or unevenly distributed about the interior diameter of the barrel and extend along a portion of the barrel or along the full length.

In embodiments with splines, the splines are preferably spaced at increments of 15 to 30° about the interior diameter of the barrel and more preferably at increments of approximately 22.5°.

In one aspect of the invention, the locking member has an engaging portion that is movable between a first position that extends into the space defined by the interior diameter of the barrel and a second position that does not extend into the space defined by the interior diameter of the barrel. Preferably, the engaging portion is positioned adjacent the upper portion of the universal mount. Also preferably, the locking member further comprises an actuator that moves the engaging portion from the first position to the second position. More preferably, the engaging portion is elastically biased towards the first position and the engaging portion has a ramped edge configured to urge the engaging portion from the first position when an object is inserted into the barrel.

In one embodiment, the upper portion of the universal mount has a face configured to rest against a substantially flat mounting surface and wherein the barrel penetrates an opening in the mounting surface. Preferably, the body comprises a plurality of evenly spaced holes in the upper portion for accepting fasteners to secure the universal mount to the mounting surface.

Preferably, the universal mount barrel has an interior diameter less than approximately 75 mm. More preferably, the interior diameter of the barrel is in the range of approximately 25 to 50 mm.

In one aspect of the invention, the upper portion of the universal mount projects less than approximately 40 mm when secured to the mounting surface. Preferably, the upper portion of the universal mount projects in the range of approximately 5 to 20 mm above the mounting surface.

In one embodiment, the barrel has a bottom, further comprising a plumbing connection at the bottom of the barrel in fluid communication with the interior diameter of the barrel. In an alternative embodiment, the barrel has an electrical connection at the bottom of the barrel. In the noted embodiment, a radial portion of the interior diameter of the barrel preferably does not have splines to force a specific rotational orientation.

In another embodiment of the invention, the system includes a plurality of universal mounts, wherein a first universal mount is configured to withstand relatively greater forces and has a first barrel length and wherein a second universal mount is configured to withstand relatively lesser forces and has a second barrel length shorter than the first barrel length.

In yet another embodiment of the invention, the system also includes the insert, wherein the insert is an accessory having an upper portion and a lower portion, wherein the lower portion is substantially cylindrical and has an outer diameter configured to be received by the interior diameter of the barrel of the universal mount.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which:

FIG. 7 is a side view of an alternate embodiment of a splined accessory insert, according to the invention;

FIG. 8 is a sectional view of the splined accessory insert shown in FIG. 7;

DETAILED DESCRIPTION OF THE INVENTION

Before describing the present invention in detail, it is to be understood that this invention is not limited to particularly exemplified materials, methods or structures as such may, of course, vary. Thus, although a number of materials and methods similar or equivalent to those described herein can be used in the practice of the present invention, the preferred materials and methods are described herein.

It is also to be understood that the terminology used herein is for the purpose of describing particular embodiments of the invention only and is not intended to be limiting.

Unless defined otherwise, all technical and scientific terms used herein have the same meaning as commonly understood by one having ordinary skill in the art to which the invention pertains.

Further, all publications, patents and patent applications cited herein, whether supra or infra, are hereby incorporated by reference in their entirety.

Finally, as used in this specification and the appended claims, the singular forms "a, "an" and "the" include plural referents unless the content clearly dictates otherwise.

Generally, the invention is a universal mounting system allowing a wide variety of accessories to be used interchangeably among one or more mounts secured to convenient surfaces or structures, such as the gunnel of a boat. The universal mount system includes a mount having barrel configured to receive the insert member of an accessory. Preferably, a locking mechanism on the mount engages the insert automatically, when the insert is positioned completely within the barrel. Further, the locking mechanism preferably engages the insert regardless of the rotational orientation of the insert. Interlocking splines on the insert member and along the barrel of the mount secure the insert at a desired rotational orientation. Virtually any accessory or piece of equipment can be adapted to include an insert member for use with the universal mounting system of the invention.

As will be appreciated, the invention can provide a mount that presents a low profile and blends smoothly into the gunnel so that the mount does not compromise the gunnel area when an accessory is not present. Since the system is appropriate for almost every marine accessory, the choice of mounting location is simple. Multiple mounts can be located in convenient spots, evenly spaced along the gunnel. The boat owner can start with just a few installations and add additional mounts as the accessories demand. If an additional mount is added to relocate or add an accessory, the original mount is still functional, conveniently located and ready for any accessory or use that may come up in the future.

Figure 1:
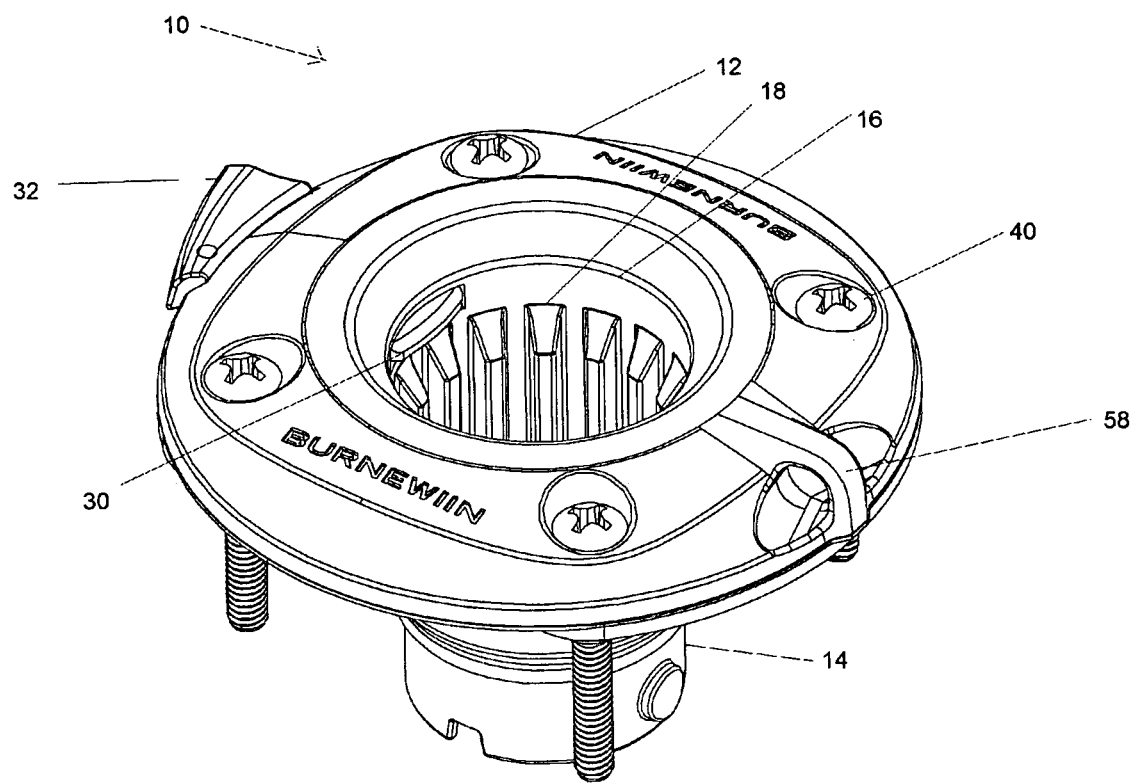
FIG. 1 is an elevational view of a universal mount, according to the invention.
Figure 2:
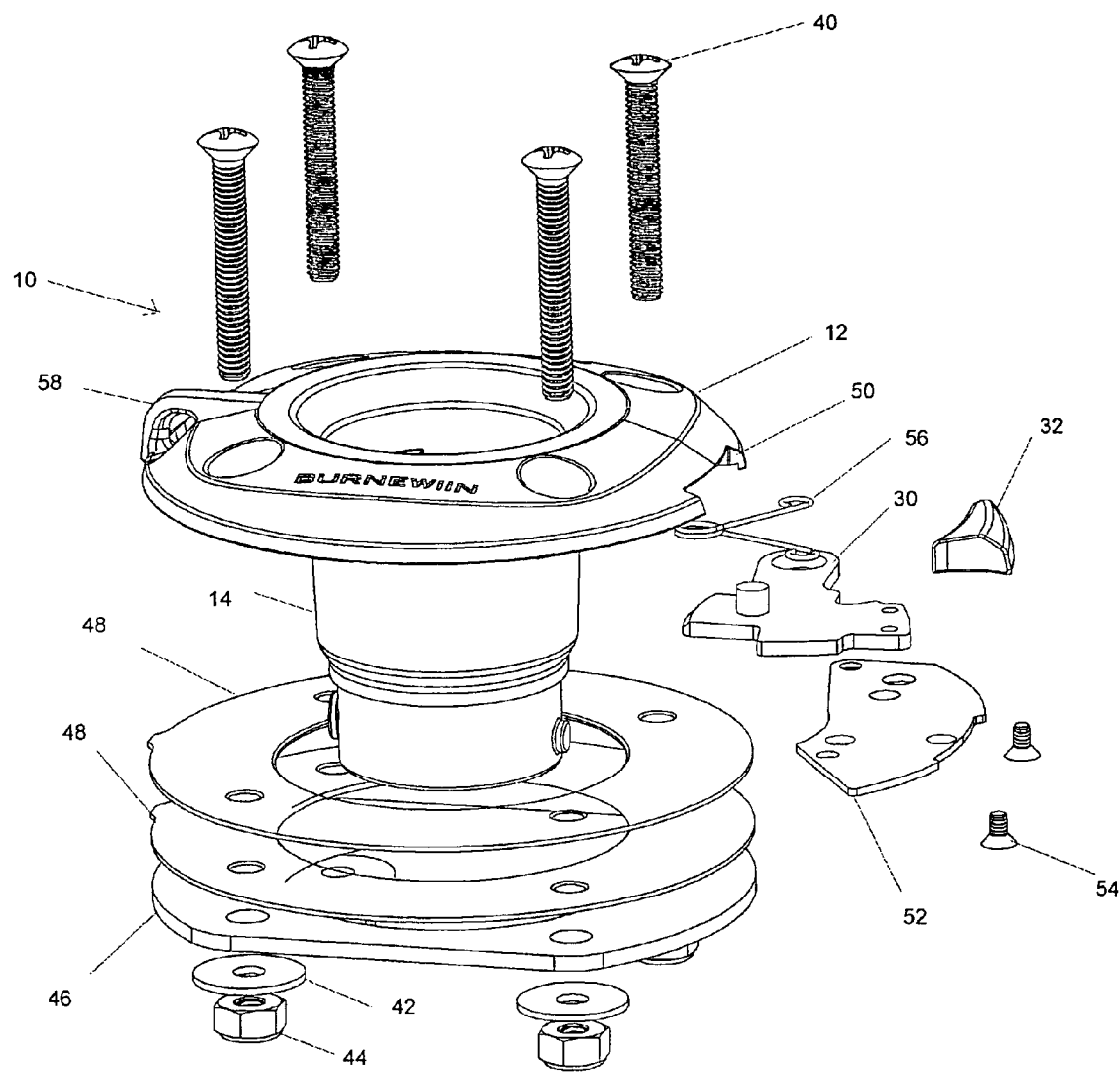
FIG. 2 is an exploded view of the universal mount shown in FIG. 1.

Turning now to the elevation view shown in FIG. 1 and the exploded view in FIG. 2, one embodiment of the universal mounting system of the invention including universal mount 10 generally comprises a body 12 that defines a relatively large diameter barrel 14 with a center orifice 16 having an interior diameter with splines 18 that is configured to receive a splined or spineless insert.

Figure 3:
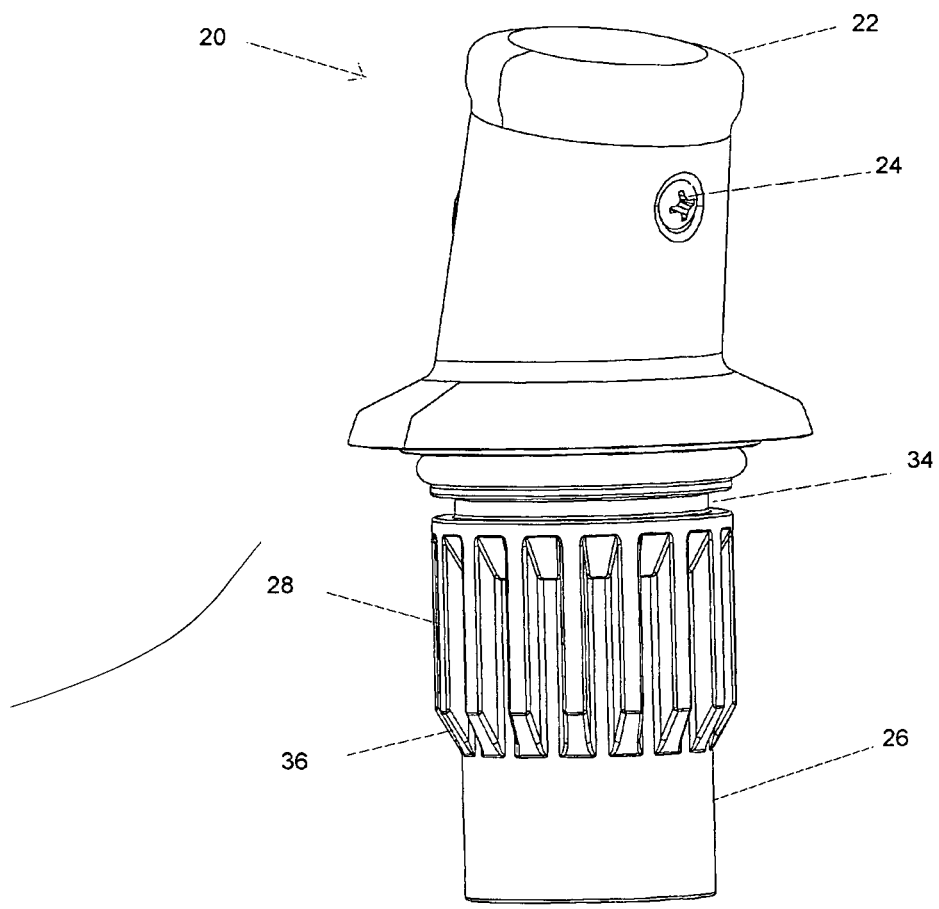
FIG. 3 is an isometric view of a splined accessory insert, according to the invention.

An example of a splined insert is shown in FIG. 3, which generally includes an upper portion that is dedicated to the particular accessory and a lower portion that interacts with universal mount 10. FIG. 3 shows in elevation a bimini mount 20, which includes a housing 22 configured to receive a pole, rod or other framework element of a canopy top. Screw 24 is used to lock the framework into position. The lower portion of bimini mount 20 comprises the insert member 26, which has a diameter that fits closely within barrel 14. Complimentary splines 28 on insert member 26 are configured to mate with splines 18 on universal mount 10. Further details regarding accessories suitable for use with the universal mounts of the invention are described in U.S. Provisional Patent Application Ser. No. 60/842,794, filed Sep. 6, 2006 and co-pending U.S. application Ser. No. {to be assigned}, filed Jul. 2, 2007, entitled "Accessories for Universal Mounting System," each of which are incorporated in their entirety by reference.

Thus, once insert member 26 has been fully inserted into universal mount 10, the engagement of splines 18 and 28 prevent rotation. In the embodiment shown, the splines are positioned at 22.5° around the circumference and are oriented substantially perpendicular to the face of body 12. Fewer splines can be used, but this will limit the number of rotationally indexed positions possible for the insert. More splines can also be used for a greater variety of rotational positions, but this can weaken the system. The non-splined portion of insert member 26 allows the insert to be partly inserted into universal mount 10 and rotated freely. When the desired orientation is reached, full insertion engages splines 18 and 28 to prevent further rotation and also engages locking member 30 with recess 34 to prevent removal of insert member 26 until trigger 32 is activated.

Universal mount 10 preferably includes a locking member 30 that is actuated by trigger 32 and is configured to engage an annular, radial recess 34, located above splines 28 on the insert member 26. Engagement of locking member 30 in radial recess 34 prevents movement of the insert member 26 along the longitudinal axis of barrel 14. Further, radial recess 34 is preferably uniform around the circumference of insert member 26 so that locking member 30 can engage it regardless of the rotational orientation of insert member 26. Thus, locking member 30 prevents the insert from being withdrawn until trigger 32 is activated. Further, when locking member 30 is engaged in recess 34, splines 18 and 28 are maintained in their interlocked position so that insert member 26 is rotationally secured.

In other applications, insert member 26 can be configured without splines, so that it will rotate freely within universal mount 10. Preferably, radial recess 34 still operates to lock the insert within universal mount 10.

The depth of barrel 14 can be varied to restrict the type of insert that can be used with universal mount 10. For example, when universal mount 10 is constructed of stainless steel, aluminum, other metals and alloys, or other high strength materials, barrel 14 is a given length. Accordingly, inserts that require a high strength mount, such as rod holder, winch holders, down riggers, and the like, are designed with an insert member 26 of corresponding length. Conversely, when universal mount 10 is constructed of lower strength materials, for example for cost or weight considerations, barrel 14 is configured to have a shorter length that will not accept the longer insert member 26 of accessories that are expected to transmit greater forces to the mount 10. Inserts that are not expected to experience high loads can be configured with a shorter insert member 26 that will be accepted by both the longer barrel of high strength mounts and the shorter length of lower strength mounts.

Alternatively, the number and spacing of the splines can be varied to restrict the use of accessories with various mounts. Generally, it is desirable for a high strength mount to accept all accessories, while a relatively lower strength mount should accept only light duty accessories. In other words, heavy duty accessories have a spline pattern that fits heavy duty mounts while light duty accessories have a spline pattern that fits both heavy and light duty mounts.

Splines 18 are positioned regularly around the circumference of orifice 16. Complementary splines 28 on the insert lock the insert into a given rotational orientation once the insert is positioned within universal mount 10. Thus, the insert can be rotated in so that the attached accessory is mounted at multiple horizontally rotated angles.

In one embodiment of the invention, one or more of splines 18 are missing from universal mount 10. When a corresponding insert having a matched configuration is used with this mount, such an insert can only be inserted at one rotationally indexed angle. This feature ensures that accessories that need to be specifically aligned or indexed for insertion will only insert one way. An example is accessories that include an electrical connection where the electrical contact alignment is important.

Preferably, the entrance to orifice 16 is tapered to ease the introduction of the insert. Similarly, the incident edge of splines 18, splines 28 and locking member 30 have a lead in ramp, such as approximately 60°. Locking member 30 is configured to be automatically retracted when an insert is being placed within universal mount 10. Locking member 30 is spring biased so that locking member 30 will positively engage radial recess 34 on the insert. The lead in portion 36 of splines 28 cooperates with the ramped incident edge of locking member 30, so that the insertion force causes locking member 30 to retract. As can be appreciated, the trailing edge of locking member 30 preferably is not ramped so that it will positively engage recess 34 and prevent removal of the insert until trigger 32 is used to retract locking member 30. Since recess 34 is continuous around the insert member 26, locking mechanism 20 will engage with it at all rotationally inserted positions. In some embodiments, an O-ring can be positioned above recess 34 to buffer and cushion the interface between the accessory and universal mount 10.

Thus, universal mount 10 presents a very low profile when accessories are not attached. Preferably, universal mount 10 projects less than approximately 40 mm from the mounting surface and, more preferably, extends in the range of approximately 5 to 20 mm above the mounting surface.

As discussed above, FIG. 2 shows an exploded view of universal mount 10. For strength considerations, it is generally preferably to form body 12 from a monolithic piece of material, for example by casting, milling or molding. The upper portion of body 12 presents a flat surface that is configured to rest securely against the substantially flat mounting surface. Screws 40, washers 42 and nuts 44 can be used to secure universal mount 10 to any suitable surface, such as the gunnel of a boat. Mounting plate 46 distributes the forces of attachment over a wider area. Gaskets 48 can be positioned on each face of the mounting surface. Locking member 30 fits within a recess 50 in body 12 and is carried by plate 52. Screws 54 secure trigger 32 to locking member 30. Spring 56 biases locking member 30 inward to automatically engage recess 34 on insert member 26. Preferably, the pivot axis of locking member 30 coincides with one of screws 40 for strength.

Also preferably, body 12 has an integral eyelet 58. This creates a convenient attachment point for lanyards, ropes or lines and allows a user to secure a wide variety of objects directly to universal mount 10. For example, eyelet 58 can be used to secure a rod leash, particularly when the accessory being used in universal mount 10 is a rod holder. Eyelet 58 can also be used to secure fenders, towels or any other suitable item.

In the embodiment shown, screws 40 are positioned at 90° around the circumference of a circle. This allows a standardized series of four mounting holes to be drilled through the surface for securing the mount. Since the mounting holes are evenly spaced on the same radius, the universal mount can be secured in four different orientations using the same four drilled holes. Similarly, eight mounting holes could be drilled at 45° around the circumference of the circle. This would allow universal mount 10 to be positioned in eight different orientations.

Preferably, barrel 14 has an internal diameter less than approximately 75 mm. More preferably, barrel 14 has an internal diameter in the range of approximately 25 to 50 mm. As can be appreciated, this diameter is large enough to ensure the system has sufficient strength for high load accessories, but is also small enough to allow the universal mount 10 to be used on a wider variety of surfaces, including the gunnels of most boats. Another advantage of the diameter of barrel 14 is that it is configured to allow the convenient use of battery powered accessories as it will accommodate the diameter of conventional D-cell batteries together with a housing.

In another aspect of the invention, a simplified universal mount having the appropriately sized orifice and, optionally, a locking mechanism, can be provided for storage purposes. A number of these mounts could be located in a remote location, allowing the accessories to be securely stowed when not in use. Such a mount would not need to withstand high loads, and could therefore be constructed of lighter weight materials so as to be more economical.

Figure 4:
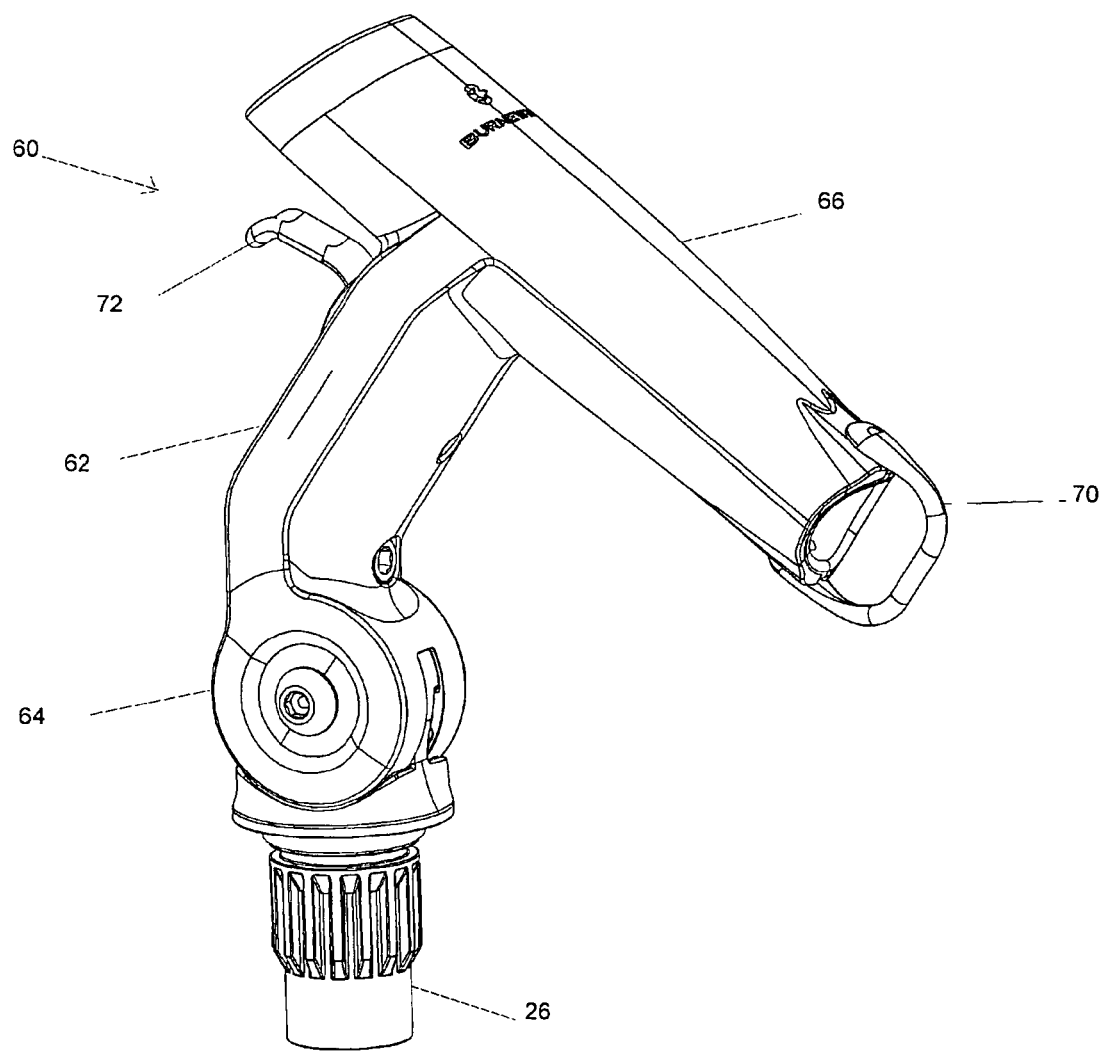
FIG. 4 is an isometric view of a rod holder configured for use with a universal mount, according to the invention.
Figure 5:
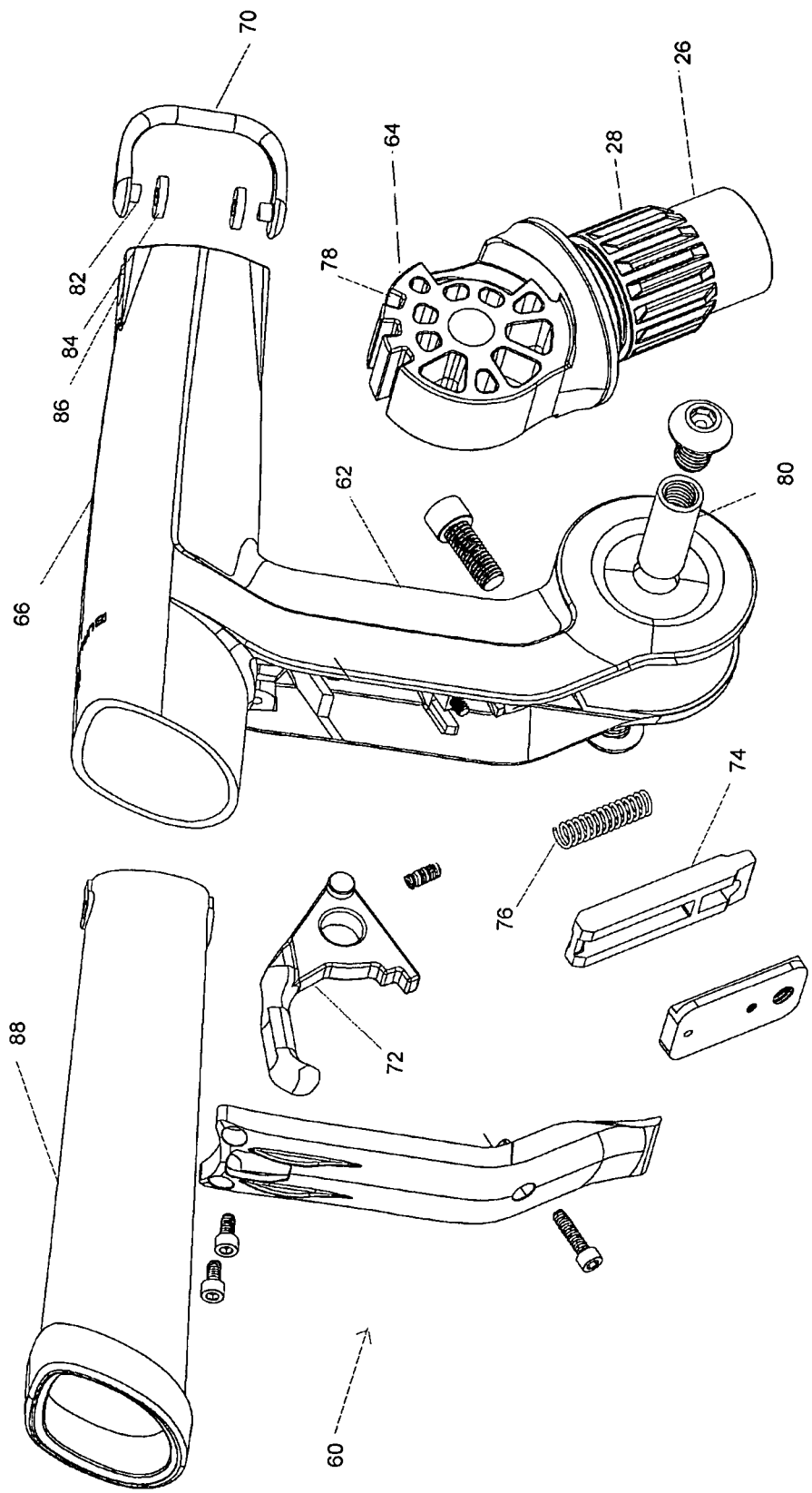
FIG. 5 is an exploded view of the rod holder shown in FIG. 4.

FIGS. 4 and 5 show an elevation and exploded view, respectively, of another accessory suitable for use with the universal mounting system, an adjustable rod holder 60. As with other accessories designed for use with universal mount 10, rod holder 60 features a splined insert member 26 having the general characteristics described above. The upper portion of rod holder 60 comprises an arm 62 with a rotating joint 64 at the end of arm 62 adjacent insert member 26. A tube 66 configured to receive the butt of a fishing rod is located at the other end of arm 68. Bail 70 at one end of tube 66 is configured to interact with the gimbal mount of a fishing rod, if so equipped. Bail 70 is preferably designed to pivot out of the way for use with rods without a gimbal. Trigger 72 operates to adjust the orientation of rotating joint 64 between a plurality of desired angles.

Conventional rod holders that exhibit pivoting motion use a joint located adjacent the butt of the rod. Although it is easier to design a holder with sufficient strength using this configuration, the rod cannot be placed in a vertical orientation due to interference between the butt of the rod and the gunnel.

As shown in FIGS. 4 and 5, placement of rotating joint 64 away from tube 66 displaces the butt of the rod from the base of the rod holder. Accordingly, a rod disposed in tube 66 can be placed in a vertical position without running into the gunnel. Further, this leaves a large area on arm 62 to incorporate trigger 72, allowing easy adjustment with or without the rod. Specifically, it allows the operator to grab the front of the rod with one hand and rod holder 60 with the other hand at the same time. If a fish is on the rod the operator can then pull back on the rod and rod holder 60 simultaneously to set the hook and get the rod into a fighting position. Rod holder 60 can also be positioned to allow easy removal of the rod.

As shown in more detail in FIG. 5, trigger 72 actuates locking member 74 which is biased by spring 76 in a downward direction to engage indexed recesses 78 on rotating joint 64. Arm 62 is pivotally attached to rotating joint 64 by axle 80. Bail 70 comprises two pins 82 at each end which mate with washers 84. Tube 66 has recesses 86 configured to capture washers 84. As can be appreciated, this means of attachment allows bail to pivot on the axis formed by pins 82, and creates no protrusions into tube 66 to interfere with the butt of a rod disposed within. Rubber sleeve 88 cushions a rod held in tube 66.

As discussed above, the low rotation point creates a long lever arm that clears the gunnel when rotated back to a vertical position. This vertical position is idea for storing the rod in a nonoperating position and negates the need for more traditional storage rod holder that are common and obtrusive in most fishing boats. Accordingly, rod holder 60 functions as both a rod holder for active fishing and a storage holder. Further, as with all accessories configured for use with universal mount 10, rod holder 60 can be removed and replaced with another accessory when not fishing.

Rod holder 60 has the described rotational adjustment mechanism locking holder in positions that are ideal for most applications. For example side gunnel mount, transom mount and vertical storage position. The design of the locking mechanism allows simple adjustment between these postions with a rod in holder 60 with no danger of the rod holder or rod falling during adjustment. Further, the positive locking feature prevents holder 60 from rotating into a forward position to minimize the chance of the rod slipping out and being lost.

Further details of suitable rod holder designs are given in U.S. Provisional Patent Application Ser. No. 60/874,410, filed Dec. 11, 2006 and in co-pending U.S. patent application Ser. No. {to be assigned}, filed Jul. 2, 2007, entitled "Adjustable Rod Holder," both of which are hereby incorporated by reference in their entirety.

In an alternative embodiment, a rod holder can be employed having a closed end to secure the butt of the rod. In such embodiments, the rod holder can comprise a tube having a cutaway portion adjacent the closed end to allow the rod to be quickly removed.

Figure 6:
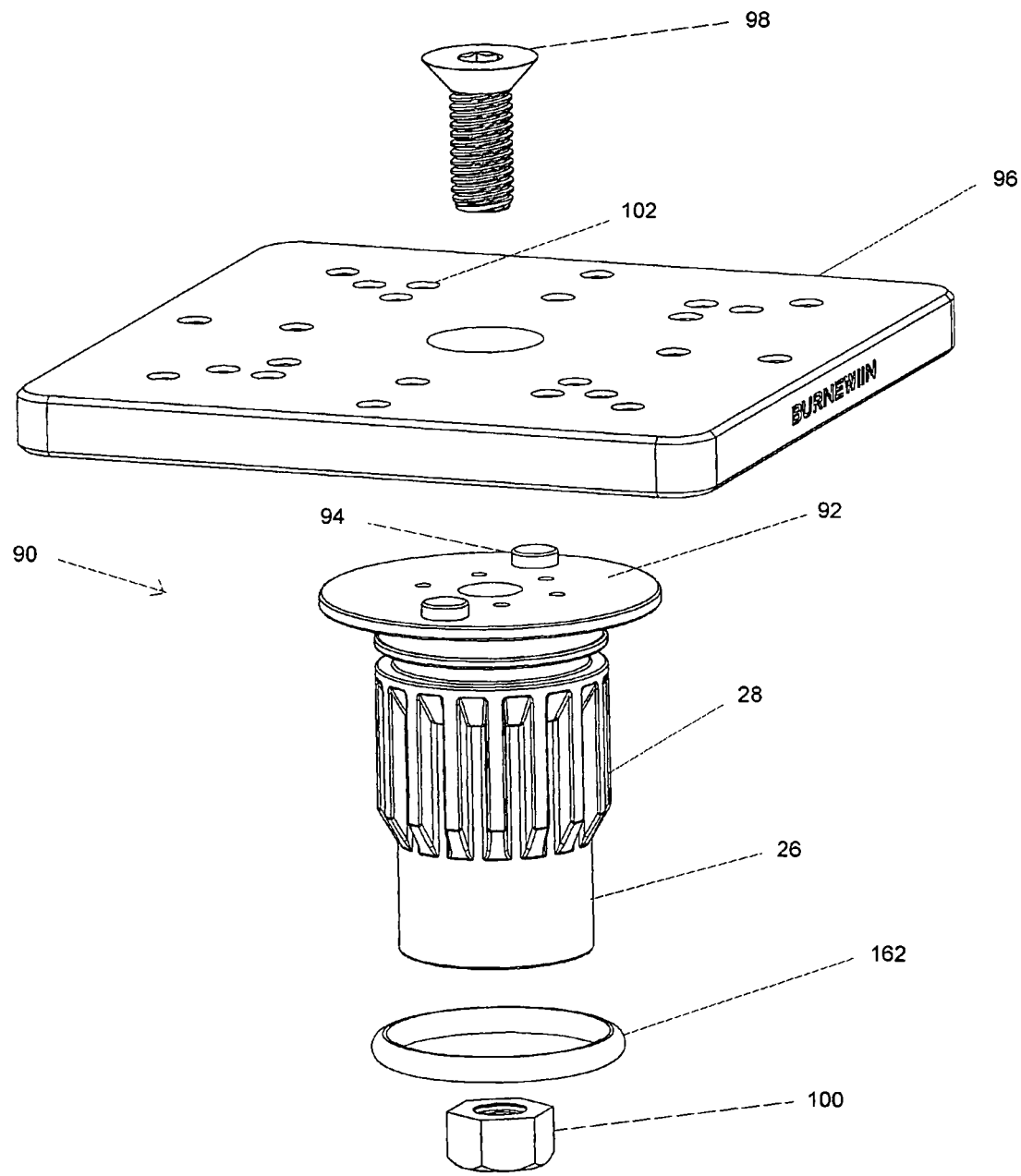
FIG. 6 is an exploded view of an alternate embodiment of a splined accessory insert, according to the invention.

FIG. 6 shows an exploded view of another accessory for use with universal mount 10. Winch adapter 90 generally comprises the splined insert member 26 as described above. The upper portion of insert member 26 is a mounting surface 92 with two registration pins 94. Winch plate 96 sits atop surface 92 and is secured to insert member 26 by screw 98 and nut 100. Recesses molded into winch plate 96 engage pins 94 to prevent plate 96 from rotating about the axis of screw 98. Although not shown, the interior of insert member 26 has a recess configured to entrap nut 100. Alternatively, insert member 26 can also have a recess configured to receive a washer, so that a screw can be inserted from underneath insert member 26, through an accessory, and secured with a nut from the top. In either of the above manners, insert member 26 can receive and be secured to a wide variety of accessories and devices. Winch plate 96 has a plurality of holes 102 drilled in a pattern designed to accommodate a wide variety of standard winch mounts. In some embodiments of the invention, such winches are configured for use as downriggers, crab pot pullers and the like.

Turning now to FIGS. 7 and 8, a tube adapter 110 is shown that allows tubes with a wide variety of diameters to be securely fastened to an insert member 111 for mounting to universal mount 10. Insert member 111 has a tapered bore. FIG. 7 is an elevated view of tube adapter 110 and FIG. 8 is a cross-section view of tube adapter 110 taken at line A-A. Tube 112 is fitted with a tapered collet 114. By adjusting the inner diameter of collet 114, a variety of diameters for tube 112 can be accommodated. Barrel nut 116 is disposed in a transverse hole in tube 112 and collet 114. Screw 118 is threaded through nut 116 and washer 120 is disposed within a recess at the base of insert member 111 to disperse the forces exerted by screw 118. By tightening screw 118, tube 112 and tapered collet 114 are drawn into the bore of insert member 111, securely attaching tube 112 to insert member 111 for use with universal mount 10.

As can be appreciated, a wide variety of accessories can be mounted to a tube, which can in turn be attached to insert member 111. Examples of such accessories include, but are not limited to, bait boards, fillet boards, angle plates, ladders, BBQ mounts, trailer balls, universal rail mounts, deck mounts, tables, seats, cup holders, cleats, multiple rod holders, line spoolers, water ski or wakeboard holders, ski towers, fly tying vices, compass mounts, camera mounts, trolling motor mounts, flag rods, bait containers, and the like. Alternatively, these accessories can also incorporate an insert member using attachment means other than a tube.

Figure 9:
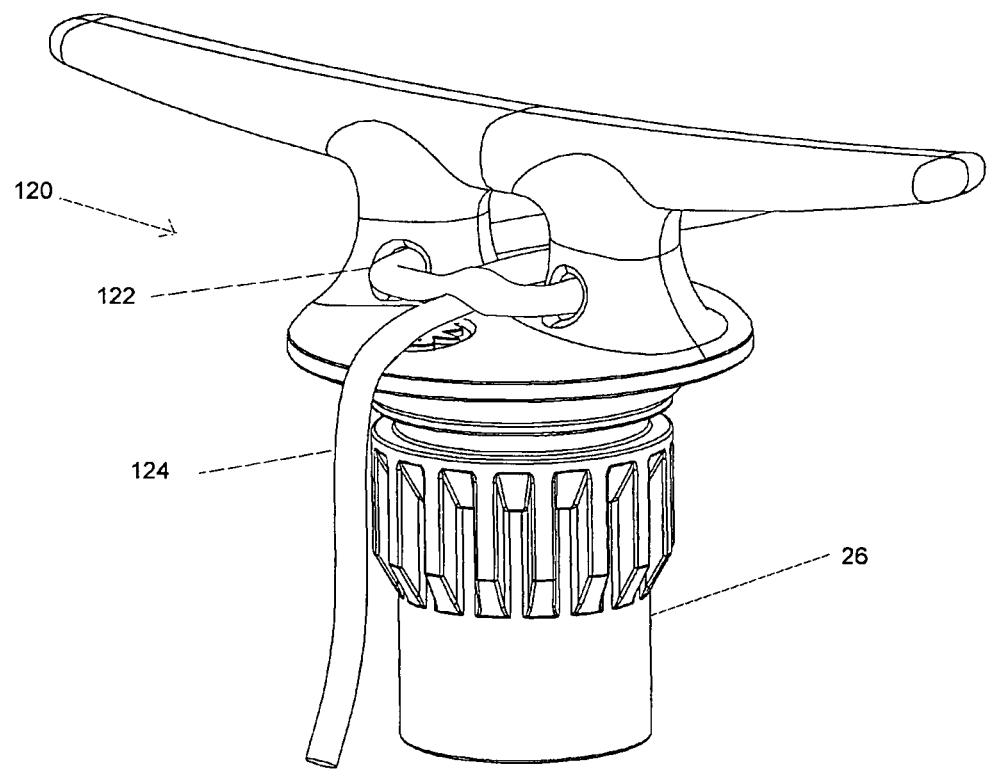
FIG. 9 is an elevational view of an alternate embodiment of a splined accessory insert configured for use as a cleat, according to the invention.

FIG. 9 is an elevational view of a cleat 120 secured to insert member 26 for use with universal mount 10. As with all splined inserts of the system, cleat 120 can be rotated to any desired orientation, and then locked into position, both rotationally and axially. In a preferred embodiment of the invention, cleat 120 is configured with holes 122 to allow line 124 to be rigged in a self-cinching manner, so that it can be rapidly secured at adjustable positions. As can be appreciated, the noted embodiment is particularly suitable for use with a fender. By adjusting the length of the line 124 extending from cleat 120, a fender can rapidly be positioned at different heights to accommodate differing dock elevations or changes in buoyancy. Similarly, the use of universal mount 10 allows cleat 120 and fender to be entirely removed and stowed when not needed, freeing universal mount 10 for use with another accessory.

Figure 10:
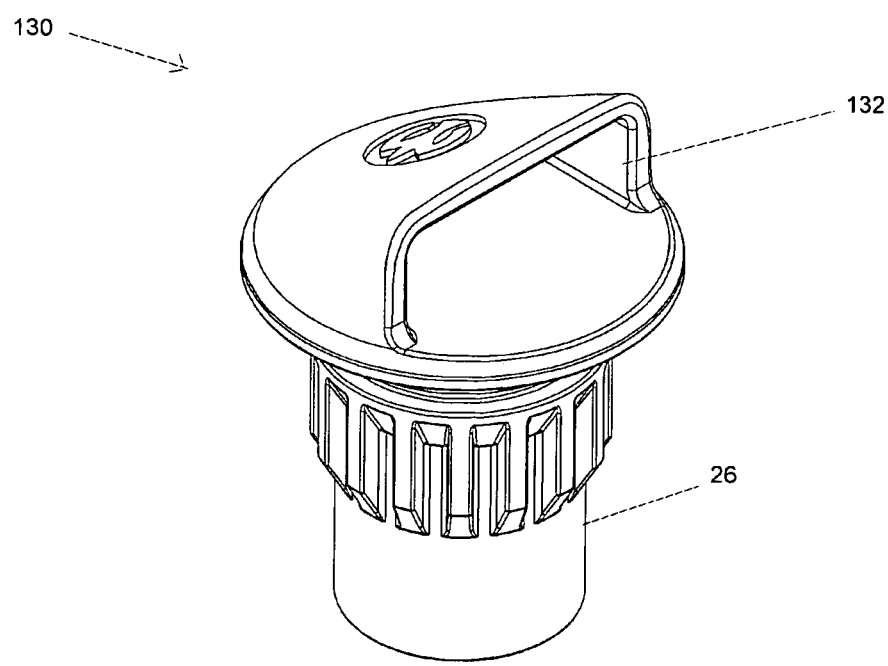
FIG. 10 is an elevational view of an alternate embodiment of a splined accessory insert, according to the invention.

FIG. 10 is an elevational view of a canopy or deck bow mount 130 secured to a splined insert member 26. Recess 132 is configured to receive the framework of a canopy. Thus, for example, a boat being stored can be equipped with canopy mounts 130 in the universal mounts 10 to secure a canopy and protect the boat from the elements. When the boat is in use, canopy mounts 130 can be completely removed, freeing universal mounts 10 for use with other accessories.

Figure 11:
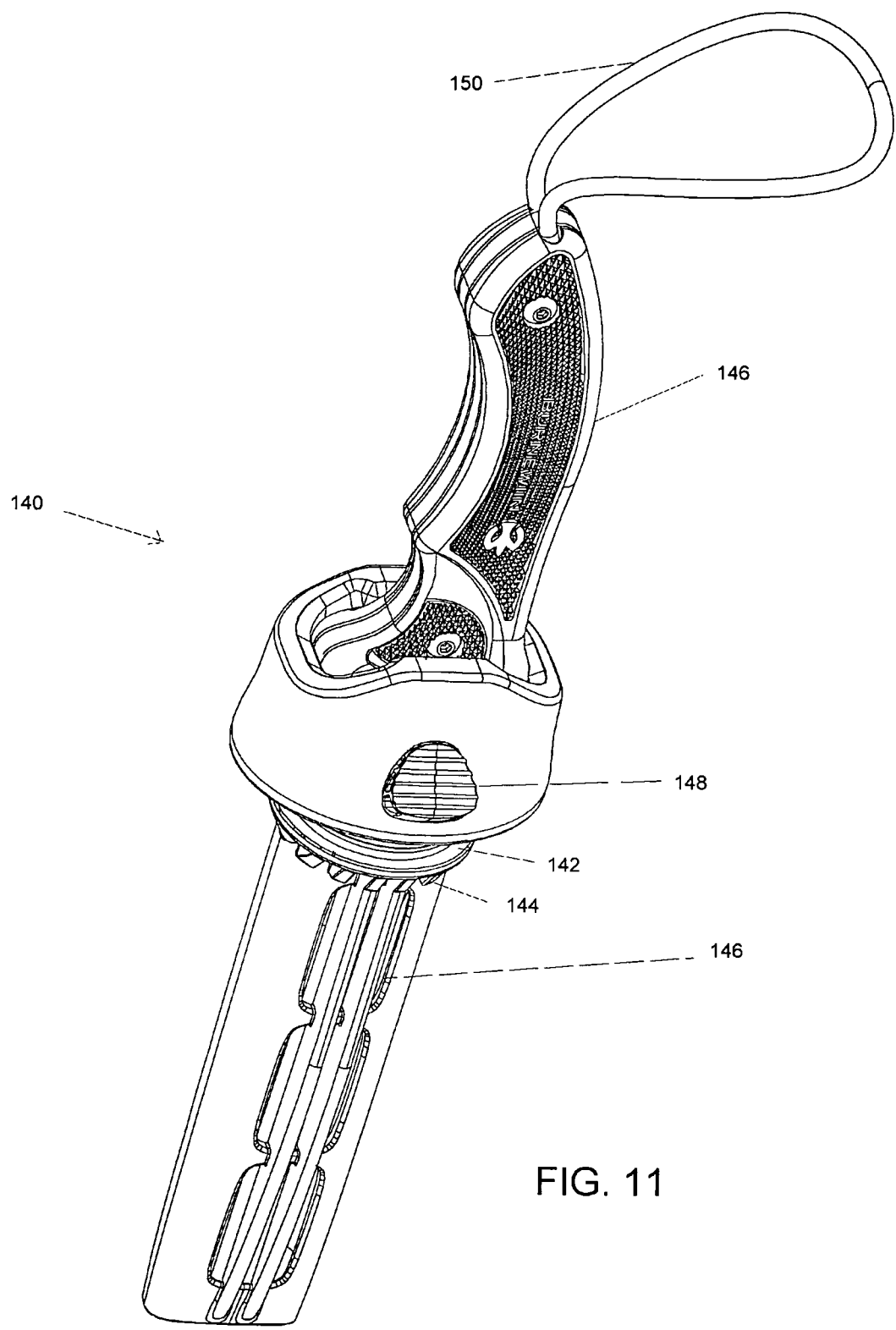
FIG. 11 is an elevational view of a knife and sheath configured to mate with the universal mount, according to the invention.

Yet another accessory adapted for use with universal mount 10 is shown in FIG. 11. Sheath 140 is configured hold a tool and be received within orifice 16 so that radial recess 142 engages with locking member 30, securing sheath 140 within universal mount 10. Lead ins 144 retract locking member 30 upon insertion, as described above. In this embodiment, sheath 140 does not feature splines, so that it is free to rotate within universal mount 10, even when locking member 30 is engaged in radial recess 142. Thus, sheath 140 will pivot to accept the tool in whichever orientation is most ergonomic to the user. Similarly, the tool will remain in that orientation to facilitate withdrawal. Sheath 140 also features cutouts 146 to allow rapid draining and facilitate cleaning.

A wide variety of tools can be adapted for use with sheath 140 to allow rapid and convenient storage together with easy accessibility. In the embodiment shown, a knife 146 is disposed within sheath 140. Trigger 148 on sheath activates a locking mechanism to releasably secure knife 146 within sheath 140. Preferably, locking mechanism is activated automatically by insertion of the tool into the sheath, for example, in a manner similar to the locking mechanism described above for the insert member and universal mount. Lanyard 150 can be adjusted by the positioning of knots that are captured in recess of the knife handle.

Figure 12:
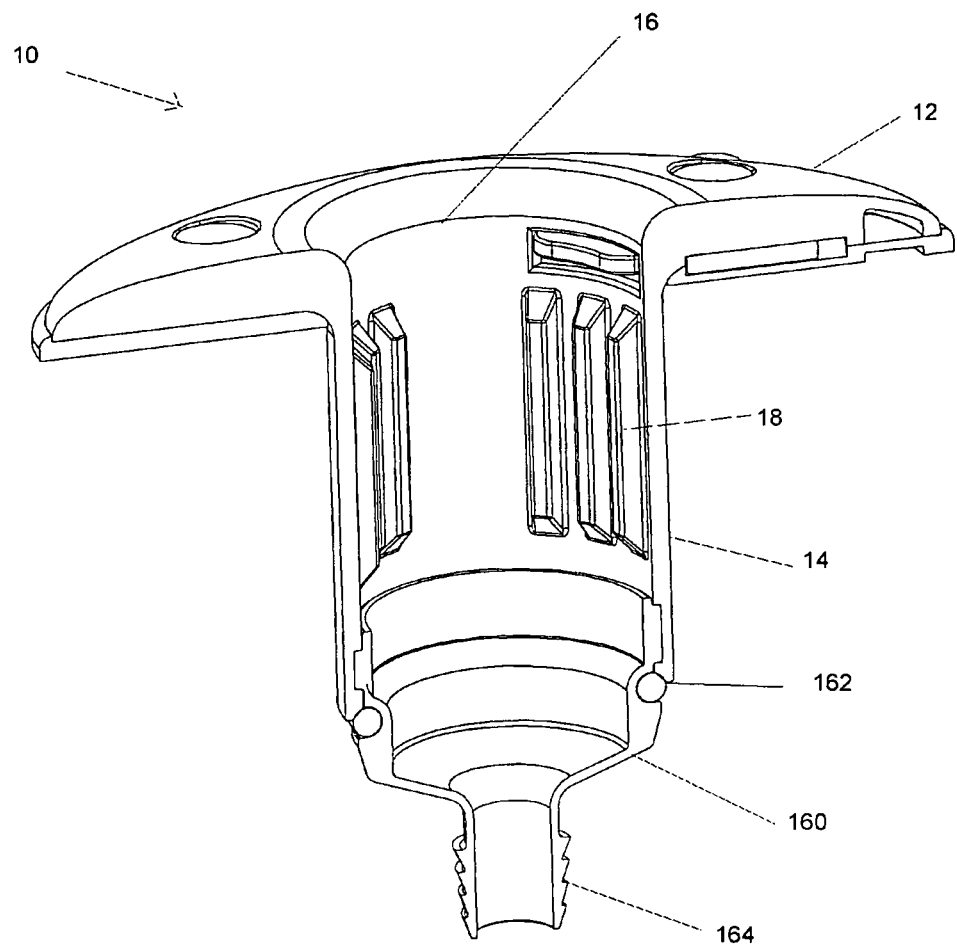
FIG. 12 is a sectional view of a universal mount, showing fluid management connections, according to the invention.

FIG. 12 is a cut away view of a universal mount 10 embodying features of the invention. As can be seen, this embodiment is equipped for drain management with drain 160 secured to the bottom of barrel 14. The attachment of drain 160 to barrel 14 can be made by bayonet fittings as shown, or by a screw type fitting or by other suitable means. O-ring 162 provides a water tight seal to universal mount 10. Drain 160 has a barbed connector 164 to allow convenient of attachment of tubing to conduct liquid to the bilge or other desired area.

Figure 13:
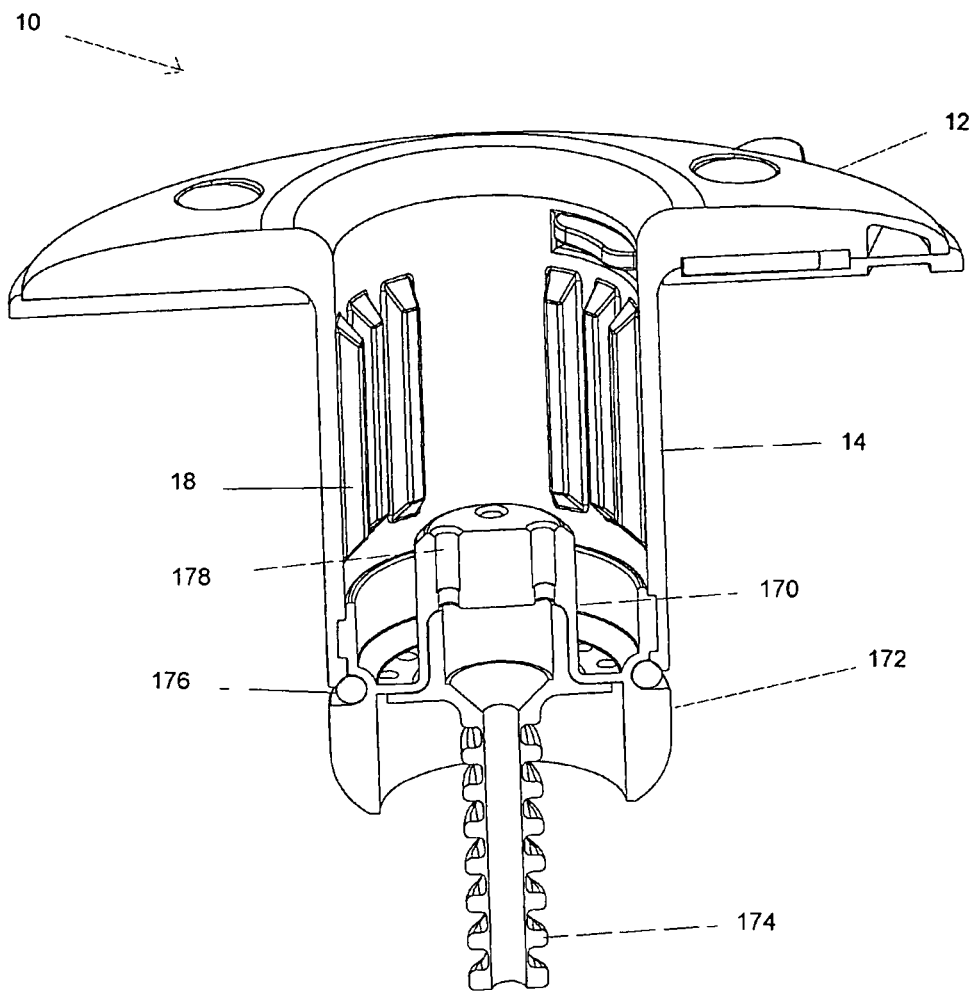
FIG. 13 is a sectional view of a universal mount, showing electrical connections, according to the invention.

FIG. 13 also shows a cut away view of universal mount 10, this time having an electrical connector 170 secured to barrel 14. Electrical connector comprises a fitting 172 that secures to barrel 14 via a bayonet connection and strain relief 174 to house the cables (not shown). Alternatively, a screw-type attachment or other means of securing electrical connector 170 can be used. O-ring 176 seals the connection. In the shown embodiment, electrical connector comprises four conductors 178. However, the number of leads can readily be adjusted depending upon the application. As shown, a radial portion of barrel 14 is missing one or more splines 18, so that use of a matching splined insert forces a specific rotational orientation. This feature is particularly important for embodiments featuring electronic connections to ensure the correct conductor orientation.

The insert member for an accessory designed for use with electrical connector 170 has a corresponding plug at the base of the insert member that mates with connector 170 and forms an electrical circuit with one or more of conductors 178. As can be appreciated, a wide variety of electrical accessories can take advantage of the supplied electrical connection. Examples of such accessories include, but are not limited to VHF/UHF/ antennas, radios, GPS holders, GPS antennas, universal electronic plug adapters, GPS units, fish finders, deck lights, spot lights, downrigger or outrigger mounts, universal mount plates, trolling motors, winch plates, and the like.

Preferably, insert member 26 or other inserts configured to be used with the universal mount 10 that are not designed to employ electrical connections have a hollow recess at the bottom of insert member 26 so that they can still be inserted in universal mounts that have electrical connector 170.

Another preferred embodiment of the invention comprises a cupholder with a insert member 26 for use with universal mount 10. In general, the cupholder is sized to receive, support and retain commonly sized beverage containers. Alternatively, a beverage container is configured to have an insert member 26. More preferably, the beverage container is releasably secured to the insert member 26 and features a connection that maintains a relatively flat bottom so that the beverage container will be stable when place on a surface.

A number of alternate designs are possible in the practice of the invention. For example, the universal mount can be configured with a manual locking mechanism such as two sliding parallel pins that engage opposite sides of radial recess 34. As can be appreciated, designs having more than one points of engagement between the locking mechanism and radial recess 34 can increase the strength of the system. In another embodiment, the locking mechanism can comprise one or more teeth configured to engage splines located within the radial recess of an insert member 196. This arrangement provides another means for achieving the rotational indexing features of the invention.

In yet other embodiments, universal mounts with receptacles configured to receive the insert accessories are adapted to be secured to other surfaces or structures in various orientations. For example, one universal mount having a body with a center orifice, splines and locking member as described above further includes a clamping mechanism. The clamp allows the mount to be secured to a railing or other suitable structure and still be used with any of the insert accessories designed for use with universal mount 10. In further embodiments, another universal mount includes a bracket substantially parallel with the center orifice, allowing the mount to be secured to vertical surface. As can be appreciated, any universal mount with a center orifice, splines and locking member can be configured to be secured in any desired manner to a suitably fixed structure.

Alternatively, some universal mounts of the invention may be configured without splines or without a locking member if desired. Such universal mounts still include a center orifice receptacle for the insert accessories. However, it may be convenient to omit the locking or rotational indexing features. Similarly, insert accessories can be configured without splines or without the radial recess to achieve the same functionality.

The majority of the description has been in relation to a universal mounting system incorporating a generally cylindrical insert that fits within a barrel having a circular profile. The use of interlocking splines hold the insert in a desired rotational orientation with respect to the mount. However, as one having skill in the art will appreciate, other embodiments of the invention incorporating inserts having different geometries are within the scope of the disclosure. For example, an insert having a triangular or square cross sectional profile would inherently offer three or four rotational orientations, respectively. The use of polygonal geometries with a greater number of sides would correspondingly increase the number of rotationally indexed positions.

Figure 14:
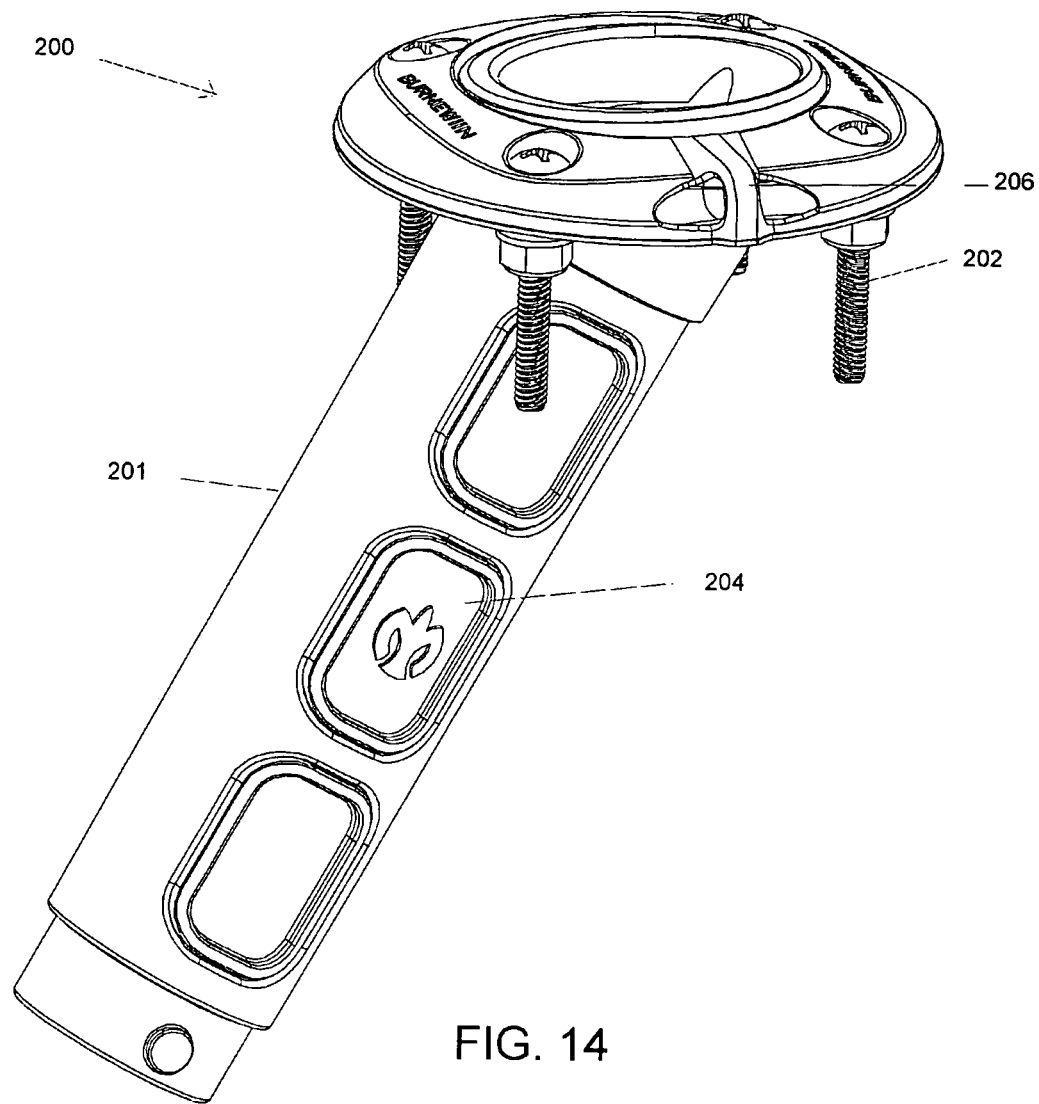
FIG. 14 is an alternate embodiment of a rod holder configured to complement the universal mount system, according to the invention.

Turning now to FIG. 14, there is shown a dedicated rod holder 200 that is designed to complement the universal mount system, comprising a tube 201 configured to receive the butt of a rod. Although rod holder 200 does not mate with universal mount 10, it is designed to convey the same look and low profile. Further, screws 202 used to secure rod holder 180 employ the same mounting pattern as universal mount 10 to allow the same set of drilled holes to be used for either device. Rubber insert 204 cushions the butt of a rod disposed within holder 200. Rod holder 200 also features an integral eyelet 206.

Figure 15:
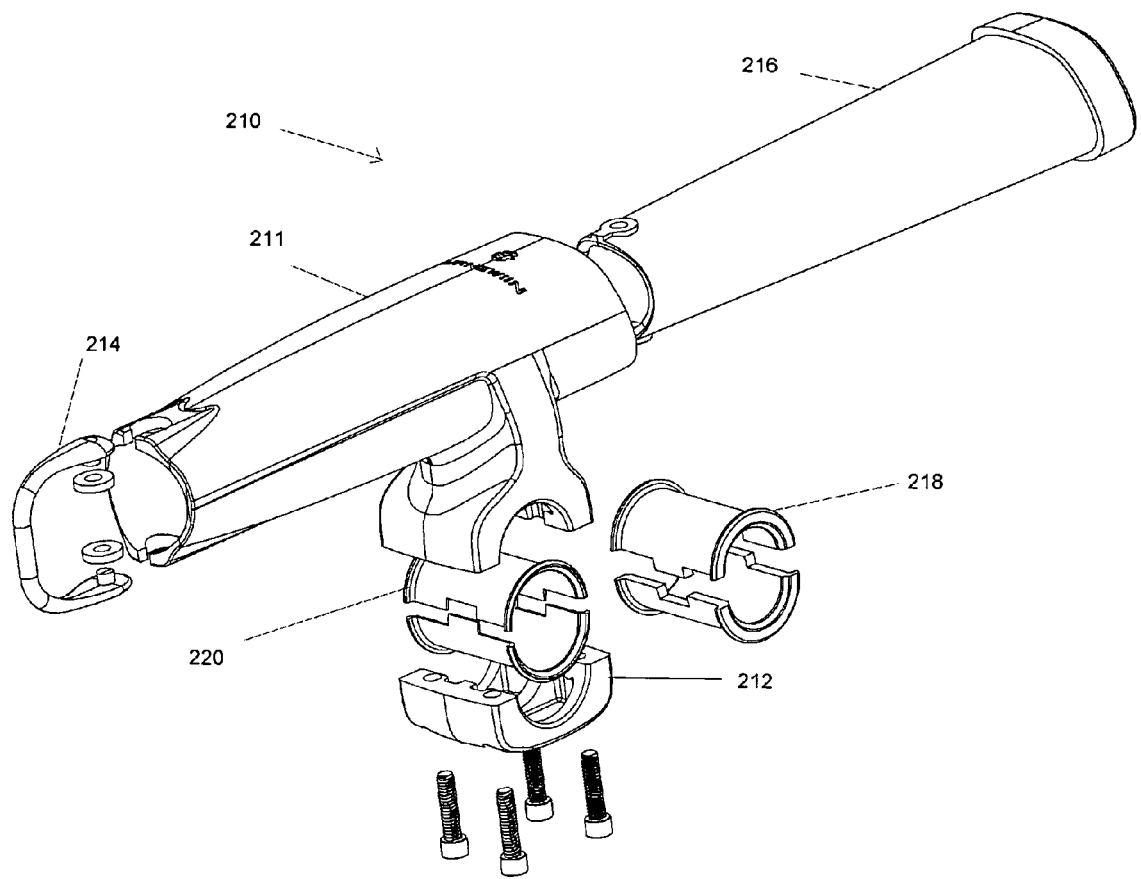
FIG. 15 is a yet another alternate embodiment of a rod holder configured to complement the universal mount system, according to the invention.

Yet another dedicated rod holder 210 is shown in FIG. 15. In this embodiment, rod holder 210 generally comprises a tube 211 configured to receive the butt of a rod that is secured to a rail by clamp arrangement 212. Rod holder 210 uses the same pivoting bail assembly 214 described above. Similarly, rubber insert 216 cushions the butt of a rod disposed within holder 210. Varying sleeves 218 and 220 can be used to accommodate rails of differing diameters. The look of rod holder 210 is designed to complement the universal mount system and accessories described above.

A number of accessories have been described with respect to the splined and non-splined inserts for use with the universal mounts of the invention. As one having skill in the art will appreciate, a wide variety of accessories can easily be adapted for use with this invention, including, but not limited to down riggers, out riggers, canopies, crab pot pullers, oar locks, fish bats, sealed containers, bait boards, fillet boards, angle plates, ladders, BBQ mounts, trailer balls, universal rail mounts, deck mounts, tables, seats, cup holders, cleats, multiple rod holders, line spoolers, water ski or wakeboard holders, ski towers, fly tying vices, compass mounts, camera mounts, trolling motor mounts, flag rods, bait containers, and the like. Indeed, virtually any accessory that benefits from permanent or temporary attachment can be used with the systems of the invention. In short, the system of the invention permits the user to achieve the goal of the adage "a place for everything and everything in its place."

Further, as described above, the universal mounts of the invention are not limited to uses on a boat, but can be employed with any other vehicle or structure that presents a suitable mounting area. Thus, the range of accessories that can be used with the universal mount system of the invention is unlimited.

Described herein are presently preferred embodiments, however, one skilled in the art that pertains to the present invention will understand that there are equivalent alternative embodiments. As such, these changes and modifications are properly, equitably, and intended to be, within the full range of equivalence of the following claims.

What is claimed is:

1. A universal mounting system for receiving and securing an insert comprising a universal mount with a body including an upper end and a lower end, a barrel extending from the upper end to the lower end having a center orifice with an interior diameter comprising a plurality of splines aligned with a longitudinal axis of the barrel, a mounting face that is fixed with respect to the barrel and positioned between the upper end and the lower end configured to rest against a substantially flat mounting surface such that the mounting face defines a mounting plane intersecting with the barrel, and a locking member that automatically engages an annular recess of the insert when the insert is fully positioned within barrel, regardless of the insert's rotational orientation with respect to the universal mount, wherein the locking member retains the insert within the barrel when engaged and wherein the locking member has an engaging portion adjacent the upper end of the universal mount that is movable between a first position that extends into the space defined by the interior diameter of the barrel and a second position that does not extend into the space defined by the interior diameter of the barrel and further comprises an actuator located in the upper end that moves the engaging portion from the first position to the second position, wherein the engaging portion has a ramped edge configured to urge the engaging portion from the first position when the insert is inserted into the barrel.

2. The universal mounting system of claim 1, wherein the plurality of splines are evenly distributed about the interior diameter of the barrel.

3. The universal mounting system of claim 1, wherein the plurality of splines are unevenly distributed about the interior diameter of the barrel.

4. The universal mounting system of claim 1, wherein the splines extend substantially along the entire barrel.

5. The universal mounting system of claim 1, wherein the splines extend substantially along only a portion of the barrel.

6. The universal mounting system of claim 1, wherein the splines are spaced at increments of 15 to 30° about the interior diameter of the barrel.

7. The universal mounting system of claim 6, wherein the splines are spaced at increments of about 22.5° about the interior diameter of the barrel.

8. The universal mounting system of claim 1, wherein the plurality of splines have a top portion that tapers to the interior diameter of the barrel.

9. The universal mounting system of claim 1, wherein the engaging portion is elastically biased towards the first position.

10. The universal mounting system of claim 1, further comprising an integral eyelet.

11. The universal mounting system of claim 1, wherein the body and barrel are formed from, a monolithic piece of material.

12. The universal mounting system of claim 1, wherein the body comprises a plurality of evenly spaced holes in the upper portion for accepting fasteners to secure the universal mount to the mounting surface.

13. The universal mounting system of claim 1, wherein the interior diameter of the barrel is less than approximately 75 mm.

14. The universal mounting system of claim 13, wherein the interior diameter of the barrel is in the range of approximately 25 to 50 mm.

15. The universal mounting system of claim 1, wherein the upper portion of the universal mount projects less than approximately 40 mm when secured to the mounting surface.

16. The universal mounting system of claim 15, wherein the upper portion of the universal mount projects in the range of approximately 5 to 20 mm above the mounting surface.

17. The universal mounting system of claim 1, wherein the barrel has a bottom, further comprising a plumbing connection at the bottom of the barrel in fluid communication with the interior diameter of the barrel.

18. The universal mounting system of claim 1, wherein the barrel has a bottom, further comprising an electrical connection at the bottom of the barrel.

19. The universal mounting system of claim 18, wherein a radial portion of the interior diameter of the barrel does not have splines.

20. The universal mounting system of claim 1, further comprising a plurality of universal mounts, wherein a first universal mount is configured to withstand relatively greater forces and has a first barrel length and wherein a second universal mount is configured to withstand relatively lesser forces and has a second barrel length shorter than the first barrel length.

21. The universal mounting system of claim 1, further comprising the insert, wherein the insert is an accessory having an upper portion and a lower portion, wherein the lower portion is substantially cylindrical and has an outer diameter configured to be received by the interior diameter of the barrel of the universal mount.

* * * * *